United States Patent
Beale (10) Patent No.: US 10,757,600 B2
(45) Date of Patent: *Aug. 25, 2020

(54) COMMUNICATIONS TERMINAL AND METHOD OF COMMUNICATING

(71) Applicant: SCA IPLA HOLDINGS INC, New York, NY (US)

(72) Inventor: Martin Beale, Bristol (GB)

(73) Assignee: SCA IPLA HOLDINGS INC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/829,640

(22) Filed: Dec. 1, 2017

(65) Prior Publication Data

US 2018/0091997 A1 Mar. 29, 2018

Related U.S. Application Data

(63) Continuation of application No. 14/345,537, filed as application No. PCT/GB2012/052354 on Sep. 24, 2012, now Pat. No. 9,860,780.

(30) Foreign Application Priority Data

Sep. 30, 2011 (GB) .................................. 1116898.6
Sep. 30, 2011 (GB) .................................. 1116902.6

(51) Int. Cl.
*H04W 28/02* (2009.01)
*H04W 88/06* (2009.01)
(Continued)

(52) U.S. Cl.
CPC ......... *H04W 28/0215* (2013.01); *H04W 4/70* (2018.02); *H04W 28/20* (2013.01);
(Continued)

(58) Field of Classification Search
CPC ...... H04W 36/30; H04W 76/04; H04L 5/0064
(Continued)

(56) References Cited

U.S. PATENT DOCUMENTS 6,084,866 A 7/2000 Dorenbosch et al.
6,519,560 B1* 2/2003 Spicer ................. G10L 19/0018
704/231
(Continued)

FOREIGN PATENT DOCUMENTS

EP 2 315 472 A1 4/2011
GB 2487757 A 8/2012
(Continued)

OTHER PUBLICATIONS

Search Report dated Jan. 30, 2012 in United Kingdom Application No. GB1116902.6.
(Continued)

*Primary Examiner* — Marsha D Banks Harold
*Assistant Examiner* — Elton Williams
(74) *Attorney, Agent, or Firm* — Xsensus LLP (57) ABSTRACT

A communications terminal communicates data to/from a mobile communications network. The mobile communications network includes a radio network including one or more base stations configured to provide a low bandwidth communications interface formed from a low bandwidth carrier for communicating the data to or receiving the data from the communications terminal in accordance with a relatively low bandwidth, and to provide a high bandwidth communications interface formed from a high bandwidth carrier for communicating the data to or receiving the data from the communications terminal in accordance with a relatively high bandwidth. The communications terminal is configured to attach for communication to the high bandwidth interface, and in response to receiving a command
(Continued)

from the mobile communications network, to detach from the high bandwidth interface and to re-attach to the low bandwidth interface for communicating the data to or from the mobile communications network via the low bandwidth interface.

20 Claims, 7 Drawing Sheets

(51) Int. Cl.
    *H04W 4/70* (2018.01)
    *H04W 76/20* (2018.01)
    *H04W 36/06* (2009.01)
    *H04W 28/20* (2009.01)
    *H04W 72/04* (2009.01)
    *H04W 60/06* (2009.01)
    *H04W 36/14* (2009.01)
    *H04W 48/18* (2009.01)

(52) U.S. Cl.
    CPC .......... *H04W 36/06* (2013.01); *H04W 60/06* (2013.01); *H04W 72/048* (2013.01); *H04W 72/0453* (2013.01); *H04W 76/20* (2018.02); *H04W 88/06* (2013.01); *H04W 36/14* (2013.01); *H04W 48/18* (2013.01)

(58) Field of Classification Search
    USPC ........................................................ 370/235
    See application file for complete search history.

(56) References Cited

U.S. PATENT DOCUMENTS

| | | | |
|---|---|---|---|
| 6,965,778 | B1 | 11/2005 | Ferguson |
| 2008/0090573 | A1* | 4/2008 | Kim .................. H04W 36/08 455/436 |
| 2010/0184458 | A1 | 7/2010 | Fodor |
| 2010/0303039 | A1 | 12/2010 | Zhang |
| 2011/0032885 | A1 | 2/2011 | Wang |
| 2011/0105122 | A1 | 5/2011 | Wu |
| 2011/0263255 | A1 | 10/2011 | Alonso-Rubio |
| 2012/0064896 | A1 | 3/2012 | Guo et al. |
| 2012/0295631 | A1 | 11/2012 | Moe |
| 2013/0100895 | A1 | 4/2013 | Aghili |
| 2014/0235242 | A1 | 8/2014 | Granzow |
| 2014/0349647 | A1 | 11/2014 | Chen |

FOREIGN PATENT DOCUMENTS

| | | |
|---|---|---|
| GB | 2487780 A | 8/2012 |
| GB | 2487782 A | 8/2012 |
| GB | 2487906 A | 8/2012 |
| GB | 2487907 A | 8/2012 |
| GB | 2487908 A | 8/2012 |
| GB | 2487909 A | 8/2012 |
| GB | 2488513 A | 9/2012 |
| JP | 2010-536256 | 11/2010 |
| WO | 99/38083 A1 | 7/1999 |
| WO | 00/27157 A1 | 5/2000 |
| WO | 02/061993 A1 | 8/2002 |
| WO | 2006/045097 A2 | 4/2006 |
| WO | 2008/023611 A1 | 2/2008 |
| WO | 2008/023613 A1 | 2/2008 |
| WO | 2008/042551 A2 | 4/2008 |
| WO | 2008/100490 A1 | 8/2008 |
| WO | 2010/045014 A1 | 4/2010 |
| WO | 2010/105422 A1 | 9/2010 |

OTHER PUBLICATIONS

International Search Report dated Dec. 13, 2012 in PCT/GB2012/052354.
"Idle mode Inter RAT load balancing", Huawei, 3GPP TSG RAN WG3 Meeting #59 bis, R3-080757, Mar. 26, 2008, XP050163964, 5 pages.
"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN;", 3GPP TS 36.300 V10.0.0, XP050553479, Jun. 22, 2011, 183 pages.
"Downlink control structure for LTE-A", ZTE, 3GPP TSG-RAN WG1 meeting #56, R1-090628, Feb. 9-13, 2009, XP050318509, 5 pages.
Harri Holma, et al., LTE for UMTS OFDMA and SC-FDMA Based Radio Access, LTE, 2009, pp. 25-27 with cover pages.
Office Action dated Apr. 26, 2016 in co-pending Japanese Patent Application No. 2014-532468.
Office Action dated Sep. 6, 2016 in Japanese Patent Application No. 2014-532468.
Ericsson, "On Inter-RAT Cell Reselection Principles", R2-070571, 3GPP, Feb. 9, 2007, pp. 1-4.
Ericsson, "On Inter-RAT Cell Reselection Principles", R2-071354, 3GPP, Mar. 22, 2007, pp. 1-4.
Ericsson, "On Inter-RAT Cell Reselection Principles", R2-071833, 3GPP, May 4, 2007, pp. 1-5.
Ericsson, "On Inter-RAT Cell Reselection Principles", R2-072553, 3GPP, Jun. 22, 2007, pp. 1-5.

* cited by examiner

FIG. 8: Signalling flow for transfer to low BW carrier on transfer to IDLE mode

FIG. 9: Message flow controlling transfer of UE to low BW eNode B by piggy backing transfer commands on RRC messages FIG. 10: Example RRC message structure for piggy backed messages

COMMUNICATIONS TERMINAL AND METHOD OF COMMUNICATING

CROSS-REFERENCE TO RELATED APPLICATIONS

The present application is a continuation of U.S. patent application Ser. No. 14/345,537, filed Mar. 18, 2014, which is based on PCT filing PCT/GB2012/052354 filed Sep. 24, 2012, and claims priority to British Patent Application 1116898.6, filed in the UK IPO on Sep. 30, 2011 and British Patent Application 1116902.6, filed in the UK IPO on Sep. 30, 2011, the entire contents of each of which being incorporated herein by reference.

FIELD OF THE INVENTION

The present invention relates to communications terminals for communicating data to and/or from mobile communications networks and methods of communicating data to and receiving data from mobile communications networks.

BACKGROUND OF THE INVENTION

Mobile communication systems have evolved over the past ten years or so from the GSM System (Global System for Mobiles) to the 3G system and now include packet data communications as well as circuit switched communications. The third generation partnership project (3GPP) has now begin to develop a fourth generation mobile communication system referred to as Long Term Evolution (LTE) in which a core network part has been evolved to form a more simplified architecture based on a merging of components of earlier mobile communications network architectures and a radio access interface which is based on Orthogonal Frequency Division Multiplexing (OFDM) on the downlink and Single Carrier Frequency Division Multiple Access (SC-FDMA) on the uplink. The core network components are arranged to communicate data packets in accordance with an enhanced packet communications system.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. Third and fourth generation mobile communication networks therefore typically employ advanced data modulation techniques on the radio interface which can require more complex and expensive radio transceivers to implement. However not all communications are of a nature which requires the full bandwidth capability of for example the LTE system.

The anticipated widespread deployment of third and fourth generation networks has led to the parallel development of a class of terminals and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication terminals (i.e. MTC terminals) communicating small amounts of data on a relatively infrequent basis. Thus the use of an MTC terminal may differ from the conventional "always-on" use case for conventional LTE terminals. Examples of MTC terminals include so-called smart meters which, for example, are located in a customer's house and periodically transmit information back to a central MTC server data relating to the customer's consumption of a utility such as gas, water, electricity and so on. In the example of a smart meter, the meter may both receive small data transmissions (e.g. new price plans) and send small data transmissions (e.g. new readings) where these data transmissions are generally infrequent and delay-tolerant. Characteristics of MTC terminals may include for example one or more of: a low mobility of the communications terminal; highly specific time controlled transmissions; delay tolerant data transmissions; transmissions which are packet switched (PS) only; transmissions of small amounts of data; mobile originated only communications; infrequent mobile terminated communications. As such typical applications for MTC-type devices would be for example monitoring applications; priority alarm applications; secure connection communications; communication of data dependent upon location specific triggers; group based MTC features (for example: group based policing and group based addressing); vending machines; "sat nay" terminals; and security cameras or sensors, etc.

It will therefore be appreciated that low bandwidth MTC-type terminals may be operating contemporaneously with conventional or legacy terminals which may require high bandwidth communications. Accordingly it is desirable to improve the efficiency with which communications resources are used by a mobile communications network which is configured to provide both low bandwidth communications and high bandwidth communications.

SUMMARY OF THE INVENTION

According to the present invention there is provided a communications terminal for communicating data to and receiving data from a mobile communications network. The mobile communications network includes a radio network part including one or more base stations configured to provide a low bandwidth communications interface formed from a low bandwidth carrier for communicating the data to or receiving the data from the communications terminal in accordance with a relatively low bandwidth, and to provide a high bandwidth communications interface formed from a high bandwidth carrier for communicating the data to or receiving the data from the communications terminal in accordance with a relatively high bandwidth. The communications terminal is configured to attach for communication to the high bandwidth interface, and in response to receiving a command from the mobile communications network, to detach from the high bandwidth interface and to re-attach to the low bandwidth interface for communicating the data to or from the mobile communications network via the low bandwidth interface. Accordingly communications resources of the mobile communications network which are allocated for the low bandwidth interface may be used more efficiently by load balancing between the low bandwidth interface and the high bandwidth interface.

Embodiments of the present invention can utilise communications resources of a mobile communications network which are allocated for a low bandwidth interface more efficiently. In one example, the one or more communications terminals which are communicating data via the low bandwidth interface belong to class of communications terminal, which are configured only to communicate via the low bandwidth interface, because they do not have a capability for communicating via the high bandwidth interface. As such the load balancing entity is configured to transfer communications terminals attached to the high bandwidth interface to the low bandwidth interface when the class of low bandwidth communications terminals are not utilising the communications resources available from the low bandwidth interface.

It is envisaged that a low bandwidth radio communications interface, which is also referred to as a low bandwidth carrier, may be provided by a mobile communications network for communicating data at a low bandwidth to communications terminals. Furthermore these communications terminals may be provided with a transmitter and receiver that can only communicate data via the low bandwidth interface. In one example these low bandwidth communications terminals may be used to form MTC-type communications devices or configured for MTC type applications. Since the low bandwidth interface has been allocated communications resources which may be difficult to re-allocate to be used by conventional higher bandwidth devices, a load balancing entity is provided to transfer conventional devices on to the low bandwidth interface, under predetermined conditions in order that the communications resources allocated to the low bandwidth interface can be more efficiently utilised. Such predetermined conditions may include whether the communications resources allocated to the low bandwidth interface are being under utilised.

The number of communication terminals which are transferred may depend on the relative utilisation of both the high bandwidth carrier and the low bandwidth carrier. If a communication terminal, which is capable of transmitting via the high bandwidth carrier, is attached to the low bandwidth carrier and has significant data to transmit, it is transferred to the high bandwidth carrier. It is only the high bandwidth capable devices like the smart-phones which were in DRX state on the low bandwidth carrier which would be transferred to the high bandwidth carrier.

In other examples the predetermined conditions for the load balancing entity to move communication terminals from the high bandwidth interface to the low bandwidth interface include, for example, whether the communication terminals are in some semi-dormant state, such as where they are only transmitting small signalling messages. Examples of such states include when the communications terminal has entered an idle state or when the communications terminal has entered a state in which it is discontinuously receiving from the network (DRX). In some examples the mobile communications network may instruct the communications terminal to enter the idle state or the discontinuous reception state, which may be instructed using a radio resource control (RRC) message. As such in some embodiments the RRC message, which instructs the communications terminal to enter idle state or the DRX state may be adapted to provide an indication that the communications terminal should detach from the high bandwidth communications interface and attach to the low bandwidth communications interface.

In other embodiments the mobile communications network may communicate to a communications terminal, which is commanded to detach from the high bandwidth interface and re-attach to the low bandwidth interface, a biasing condition for re-attaching to the high bandwidth interface from the low bandwidth interface to an effect that the communications terminal remains preferentially attached to the low bandwidth interface. As such, in order to reduce a likelihood of a communications terminal re-attaching to the high bandwidth interface from the low bandwidth interface, because the high bandwidth interface has a higher received signal strength, the communications terminal is biased to remain attached preferentially to the low bandwidth interface. As such, the communications terminal may still re-attach to the high bandwidth interface, but for example, only where signal strength received from the low bandwidth interface falls to an extent that the communication of data may be compromised. As a consequence a communications terminal in the idle state can be moved to the low bandwidth carrier for load balancing and will then remain attached to the low bandwidth carrier, rather than re-attaching to the high bandwidth carrier.

The present application claims the Paris Convention priority to UK 1116898.6 and UK 1116902.6 filed 30 Sep. 2011, the contents of which are incorporated herein by reference.

Further aspects and features of the present invention are defined in the appended claims and include a method of communicating data using a communications terminal to and receiving data from a mobile communications network.

BRIEF DESCRIPTION OF THE DRAWINGS

Example embodiments of the present invention will now be described with reference to the accompanying drawings in which like parts have the same designated references and in which.

DESCRIPTION OF EXAMPLE EMBODIMENTS

Figure 1:
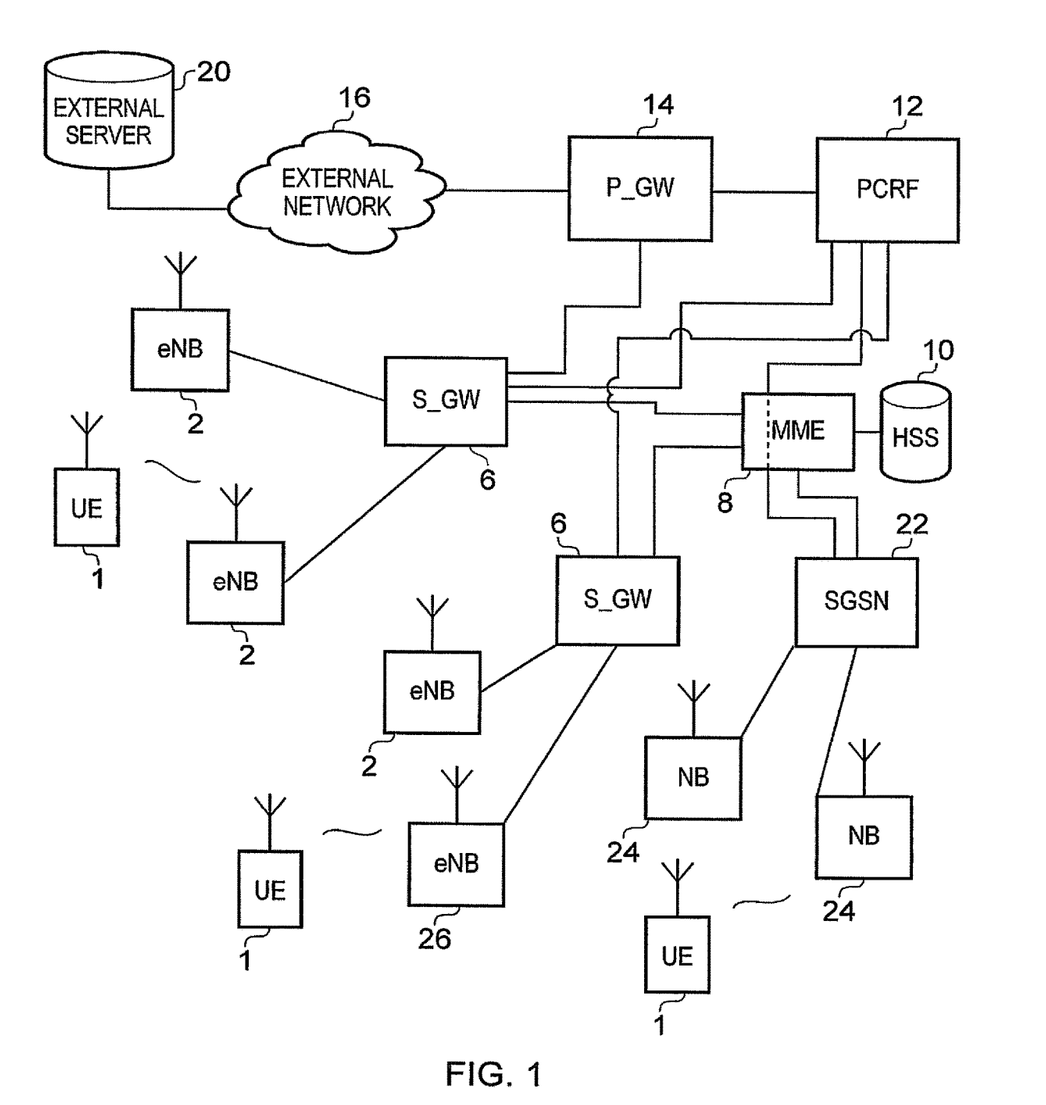
FIG. 1 is a schematic block diagram of a mobile communications network.

Embodiments of the present invention will now be described with reference to an implementation which uses a mobile communications network operating in accordance with the 3GPP Long Term Evolution (LTE) standard. FIG. 1 provides an example architecture of an LTE network. As shown in FIG. 1 and as with a conventional mobile communications network, mobile communications terminals (also called communication terminals or terminals) 1 are arranged to communicate data to and from base stations 2 which are referred to in LTE as enhanced NodeBs (eNodeB), for transmitting and receiving data via the wireless or radio access interface with the communications terminals 1.

The base stations or eNodeB's 2 are connected to a serving gateway S-GW 6 which is arranged to perform routing and management of mobile communications services to the communications terminals 1 as they roam throughout the mobile communications network. In order to maintain mobility management and connectivity, a mobility management entity (MME) 8 manages the enhanced packet service (EPS) connections with the communications terminals 1 using subscriber information stored in a home subscriber server (HSS) 10. Other core network components include the policy charging and resource function (PCRF) 12 and a PDN (Packet Data Network) gateway (P-GW) 14 which connects to an internet network 16 and finally to an external server 20. More information may be gathered for the LTE architecture from the book entitled "*LTE for UMTS OFDM and SC-FDMA based radio access*", Holma H. and Toskala A. page 25 ff.

In the following description LTE/SAE terminology and names are used. However embodiments of the present technique can be applied to other mobile communications systems such as UMTS and GERAN with the GSM/GPRS core network. Indeed as will be explained below in one example a low bandwidth carrier is provided from a radio network part of a GPRS network.

As shown in FIG. 1 in addition to the network elements which form part of the LTE network, the network also includes infrastructure equipment which operates in accordance with the GPRS standard. As shown in FIG. 1 a serving gateway support node (SGSN) 22 is connected to the MME 8 and PCRF 12. Connected to the SGSN 22 are two Node B's 24. Thus the SGSN and the Node Bs provide a radio access network conforming to the GPRS standard. Accordingly, the network shown in FIG. 1 forms a heterogeneous radio access network providing radio access interfaces in accordance with different standards. As such and as will be explained in the following paragraphs the GPRS network and more particularly the Node B's 24 can provide a low bandwidth radio access interface, which is referred to in the following discussion as a low bandwidth carrier. In contrast the radio access interface provided by the radio access part of the LTE network which includes the eNode B's 2 and the S-GW 6 can provide in one example a relatively high bandwidth communications facility in accordance with the LTE radio access interface which will be referred to in the following description as a high bandwidth carrier.

Similarly, in another example a bandwidth available to the LTE network for the radio access interface provided by the eNode B's 2 may be divided into a high bandwidth carrier part and a low bandwidth carrier part. Therefore, as will be explained shortly there are various configurations for providing a high bandwidth carrier and a low bandwidth carrier from the radio network part of a mobile communications network. In some examples the low bandwidth carrier and the high bandwidth carrier may be provided from the same radio access interface, whereas in other examples the low bandwidth carrier may be provided using a different radio access interface to the which provides the high bandwidth interface. In some examples, the low bandwidth carrier is configured to communicate small amounts of data more efficiently using the low bandwidth carrier which is particularly applicable to the communication of data from MTC-type devices.

Figure 2:
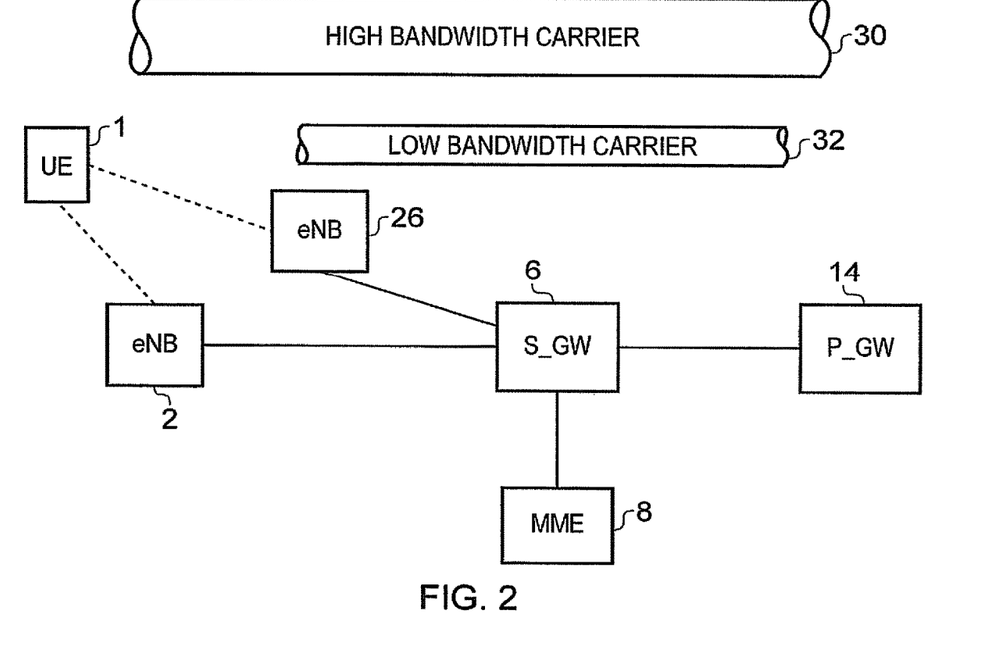
FIG. 2 is a schematic block diagram of part of the mobile communications network shown in FIG. 1 illustrating a radio access interface providing a high bandwidth carrier from a first base station and a low bandwidth carrier from a second base station contemporaneously.

As shown in FIG. 2 one example of the provision of a high bandwidth carrier and a low bandwidth carrier contemporaneously to a communication terminal (UE) 1 is shown. In FIG. 2 one of the eNode B's 2 shown in FIG. 1 is provisioned with a radio access interface which can provide a high bandwidth radio access interface for communicating data to or from the communication terminal which is represented as a high bandwidth carrier 30. However, a second eNode B 26 is shown which is configured to provide a low bandwidth radio access interface for communicating low bandwidth data which is represented as a low bandwidth carrier 32. Thus, the low bandwidth carrier 32 is representative of a radio access interface which has been designed to communicate low bandwidth data such as small amounts of delay tolerant or infrequently generated data packets more efficiently. In addition the low bandwidth carrier may be configured for use by communications terminals 1 having low bandwidth transmitters and receivers for communicating data. Thus as explained above there may be classes of devices which are provided with relatively in-expensive transmitters and receivers which are designed to communicate on a reduced bandwidth radio access interface. As such, these devices would be a class of devices which would be used for low cost applications such as for MTC devices, for which the low bandwidth carrier is provided.

Figure 3:
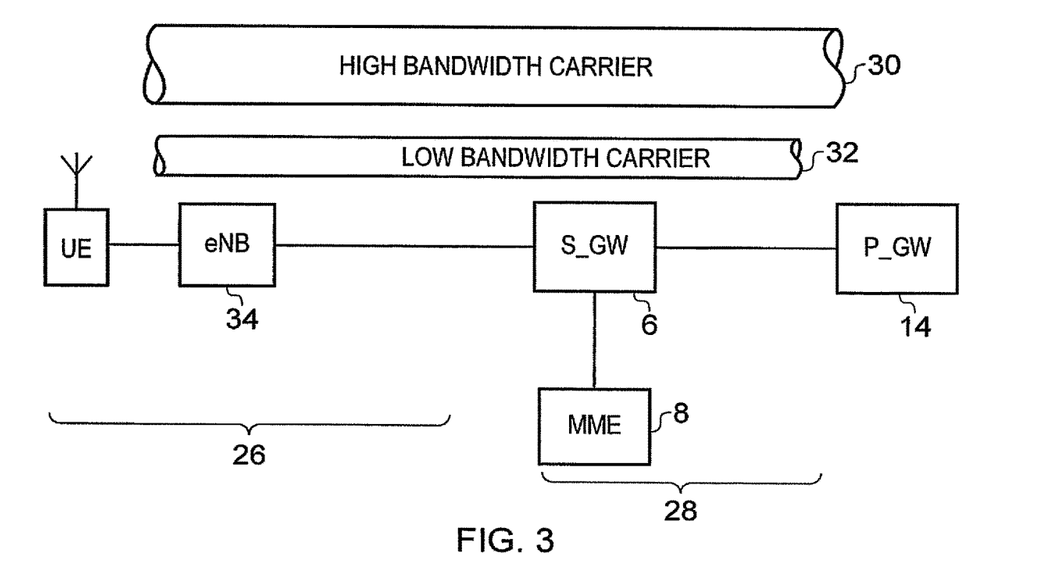
FIG. 3 is a schematic block diagram of part of the mobile communications network shown in FIG. 1 illustrating a radio access interface providing a high bandwidth carrier and a low bandwidth carrier from one base station contemporaneously.

As shown in FIG. 2 the high bandwidth carrier eNode B 2 and the low bandwidth carrier eNode B 26 are both connected to the S-GW 6 and therefore form part of the LTE network. In contrast, FIG. 3 provides an example where both the high bandwidth carrier 30 and the low bandwidth carrier 32 are provided from the same eNodeB 34. For the example shown in FIG. 3 the low bandwidth carrier may be formed from a partition of carrier frequencies of a total bandwidth available to a host radio access interface such as that disclosed in our co-pending UK patent applications and referred to as a virtual carrier, which is described below.

Figure 4:
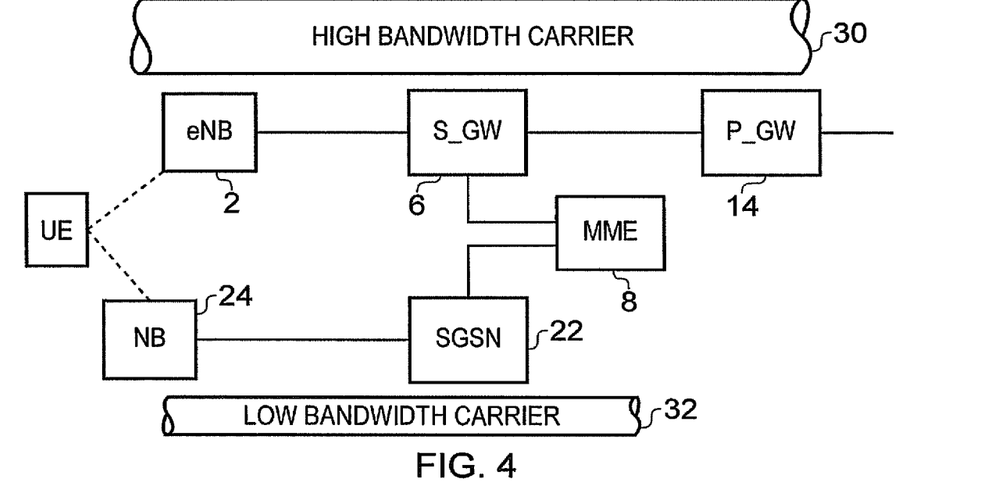
FIG. 4 is a schematic block diagram of part of the mobile communications network shown in FIG. 1 illustrating a radio access interface providing a high bandwidth carrier from a radio network part according to an LTE standard and a low bandwidth carrier from a radio network part according to a GPRS standard.

A further example is shown in FIG. 4 in which the low bandwidth carrier 30 is provided by radio access part of the LTE network which includes the eNodeB 2 and the serving gateway 6 whereas the low bandwidth carrier 32 is provided by the Node B 24 and the SGSN 22 which forms part of the GPRS network shown in FIG. 1.

As explained above, the low bandwidth carrier may be provided by a separate wireless access interface or by partitioning a part of a bandwidth allocated to a host radio access interface such as in the example of a virtual carrier. However, generally it is envisaged that a low bandwidth carrier would be available contemporaneously to a communications terminal along with a high bandwidth carrier. Furthermore, the low bandwidth carrier could be optimised for the communication of infrequently generated and small amounts of data which is delay tolerant as will be explained in the following section. In addition, the low bandwidth carrier may be developed to communicate only with communications terminals with a low bandwidth transmitter and receiver thus providing a low cost implementation for such classes of devices.

Low Bandwidth Carrier/High Bandwidth Carrier

In some examples the high bandwidth carrier 30 may utilise the entire bandwidth of the radio access interface provided by the radio network part and the protocols of the core network part but in parallel the low bandwidth carrier 32 may be established. The low bandwidth carrier may be used to form a messaging network for low cost MTC-type devices. The low bandwidth carrier 32 may use only a part of the bandwidth of the radio network part and some reduced functionality or adapted treatment by the core network part. As mentioned above, such a network which is dedicated to messaging is optimised for the communication of small amounts of data. As explained above the present technique may utilise a dedicated messaging network for communicating signalling type data which is generated by, for example, application programs. The dedicated messaging network is therefore optimised for the communication of short messages such as those associated with signalling data.

In one example the low bandwidth carrier may be created from a virtual carrier that is a carrier which exists within the complete bandwidth provided by the radio network part of a mobile communications network. Thus in one example the low bandwidth carrier may be formed as a virtual carrier using the techniques disclosed in our co-pending UK patent applications numbers: 1101970.0, 1101981.7, 1101966.8, 1101983.3, 1101853.8, 1101982.5, 1101980.9 and 1101972.6, the contents of which are incorporated herein by reference. However, embodiments of the present technique find greater application to networks in which base stations are deployed with a fixed bandwidth. The fixed bandwidth means that it is not easy to re-configure bandwidth allocated to the low bandwidth interface.

The low bandwidth carrier is provided for communicating small messages or data-grams, which can make more efficient use of hardware and communications resources compared with the high bandwidth carrier, and can support a larger amount of control signalling. For example, the low bandwidth carrier may support more physical downlink control channels (PDCCHs) per sub-frame and support a greater amount of RACH resource, which may be useful for machines that are not permanently connected to the low bandwidth carrier, but communicate in a connectionless manner.

The high bandwidth carrier is characterized as being optimized for the transmission of large messages at high speed. The high bandwidth carrier may have a restricted amount of available signalling resource in comparison to the amount of user-data resource.

Transmission of Small Data Messages

As explained above, smart-phones and portable computers for example transmit many application level signalling messages, including data request, keep-alive and polling type messages on a mobile communications network. These signalling-type messages are related to certain machine-like applications that are running on the mobile communications terminal. Example machine-like applications are:

An email client regularly polls the email server to check for updates and the email server may page the email client to inform it of pending email messages at the server. These signalling page and poll messages are typically short (may be several hundred bits).

A social networking application polls an internet server and may be "paged" by an internet server to indicate that there is an update to the user's social network that could be downloaded.

Cloud-based productivity applications may send updates to a server in the cloud indicating whether there has been an update to a document on the mobile communications terminal. If there is an update, that update could be transmitted to or from the mobile communications terminal.

Load Balancing Entity

As mentioned above, the present techniques provide an arrangement in which the low bandwidth carrier is used to support both MTC communication terminals and, when just in a low level signalling state, the high bandwidth communication terminals that would otherwise exist on the higher bandwidth carrier.

The communications network is adapted to include a load balancing entity for moving communication terminals from the high bandwidth carrier to the low bandwidth carrier. The load balancing entity will transfer to the low bandwidth carrier those communication terminals that are in a state where they are only transmitting small signalling messages. Thus conventional communications terminals which are capable of transmitting via the high bandwidth carrier and would therefore initially camp on to the high bandwidth carrier, would be instructed to transfer to the low bandwidth carrier by the load balancing entity, if those communications terminals entered a state in which they were transmitting small amounts of data. The number of communication terminals that are transferred will depend on the relative utilisation of both the high bandwidth carrier and the low bandwidth carrier. When the communication terminal is attached to the low bandwidth carrier and has significant data to transmit, it is transferred to the high bandwidth carrier.

There may be times where it is beneficial for legacy communication terminals to be supported on the low bandwidth carrier. Legacy communication terminals, such as smartphones, may be engaged in signalling-type traffic. Examples of signalling type traffic are periodic status updates, keep alive messaging, mobility measurements and commands, tracking area updates etc.

A low bandwidth carrier that is assigned for the support of MTC traffic may be underutilized in periods of time when there is insignificant MTC traffic. Given that the assignment of a separate carrier is less flexible than the assignment of a virtual carrier, this means that some of the frequency resource will be wasted at times, because it is not easy to re-assign the frequency resources of the low bandwidth carrier to the high bandwidth carrier. Accordingly, embodiments of the present technique provide a load balancing arrangement which can be used to utilize more efficiently communications resources which have been allocated to the low bandwidth carrier.

When there are multiple carriers within the same channel bandwidth, communication terminals must choose which of the carriers to camp onto. A low bandwidth communication terminal would only choose a carrier whose bandwidth was less than or equal to its capability. However a legacy communication terminal could camp on to either the low bandwidth carrier or the high bandwidth carrier. In this case load balancing algorithms would be required to move legacy communication terminals between the low bandwidth carrier and the high bandwidth carrier.

In addition load balancing algorithms may be required in order to make full use of the low bandwidth carrier when there are few low bandwidth communication terminals. In this case the low bandwidth carrier could be used for both low bandwidth communication terminals and for legacy communication terminals that are not transmitting and receiving significant amounts of data. Such legacy communication terminals that are transferred to the low bandwidth carrier would suffer a higher latency when they need to transmit and receive larger amounts of data as they would need to be handed over to the larger bandwidth high bandwidth carrier, with associated signalling delays.

The present technique provides for balancing a load between a low bandwidth carrier 32 and a high bandwidth carrier 30. As explained above, the low bandwidth carrier is specifically designed to be adapted to communicate data from communications terminals which have low bandwidth transmitters and receivers. However, given that this low bandwidth carrier is reserved for such classes of devices there may be some scenarios in which bandwidth reserved for the low bandwidth carrier may not be used by those communications terminals which are designed to communicate via the low bandwidth carrier 32. Accordingly, embodiments of the present invention address a technical problem of optimising the use of an available bandwidth for use by mobile communications network by detecting that a communications terminal is communicating low bandwidth type traffic such as small amounts of infrequently generated data and moving such communications terminals onto the low bandwidth carrier 32 when the low bandwidth carrier has capacity for communicating such data.

Figure 5:
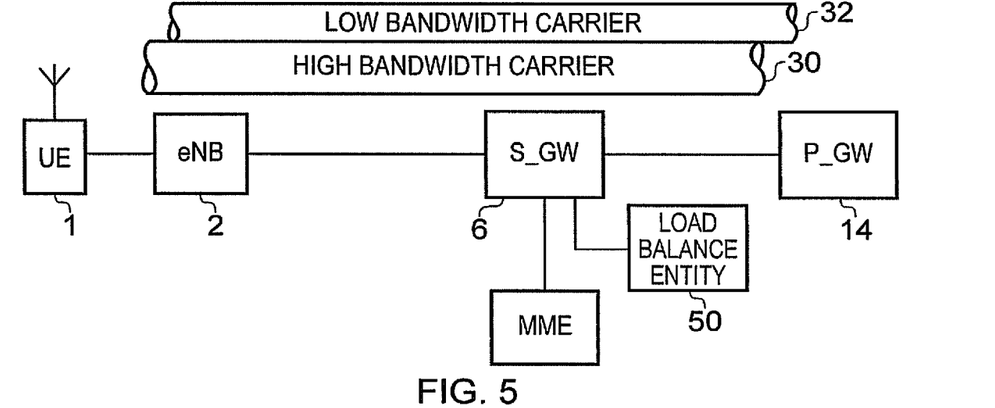
FIG. 5 is a schematic block diagram of part of the mobile communications network shown in FIG. 1 illustrating a location of a load balancing entity attached to a serving gateway of the network.
Figure 6:
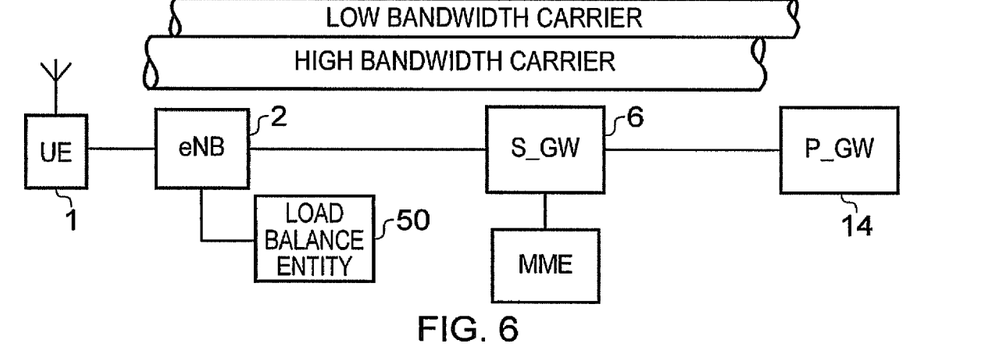
FIG. 6 is a schematic block diagram of part of the mobile communications network shown in FIG. 1 illustrating a location of a load balancing entity attached to a base station of the network.

FIGS. 5 and 6 provide two examples where a load balancing entity may be located within the mobile communications network in order to perform a load balancing between a high bandwidth carrier 30 and a low bandwidth carrier 32. As shown in FIG. 5 the load balancing entity 50 is attached to the S-GW 6 whereas in the example shown in FIG. 6 the load balancing entity 50 is attached to the eNode B 2. As will be explained in the following paragraphs the load balancing entity 50 is configured to move communications terminals from the high bandwidth carrier 30 to the low bandwidth carrier 32 or from the low bandwidth carrier 32 to the high bandwidth carrier 30 in order to optimise use of the bandwidth reserved for the low bandwidth carrier or furthermore to allow for more efficient use of the high bandwidth carrier 30. The load balancing entity 50 will now be explained.

Figure 7:
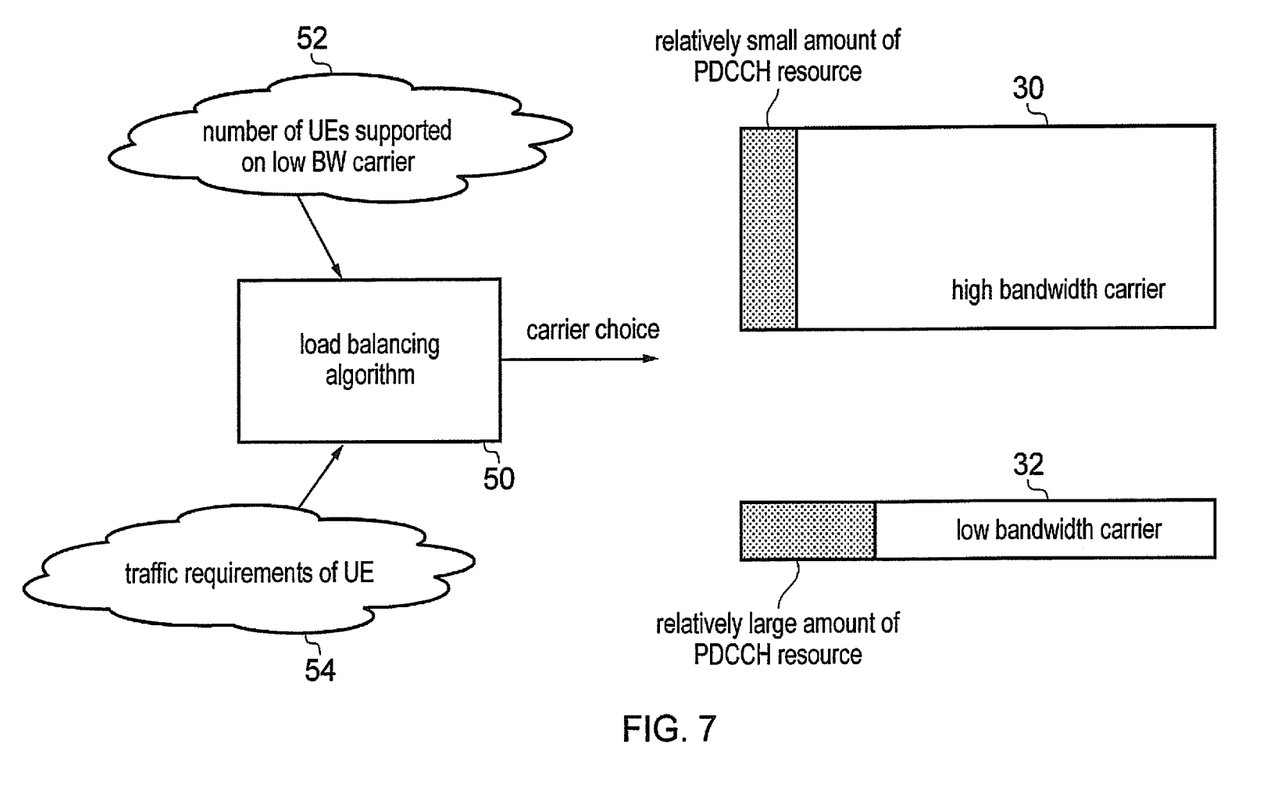
FIG. 7 is a part schematic part function block diagram illustrating an example operation of a load balancing entity according to an embodiment of the present technique.

As shown in FIG. 7 a functional representation of the operation of the load balancing entity 50 is shown to control allocation of communications terminals (communication terminal) between the low bandwidth carrier 32 and the high bandwidth carrier 30. As shown in FIG. 7 in one example the low bandwidth carrier is provided with a relatively large amount of physical downlink control channel resource (PDCCH) in order to grant more often requests for capacity on the uplink or allocate resources on the downlink of the low bandwidth carrier 32 which is matched to an expected relative increase in frequency of requests for communicating small amounts of data from a larger number of devices. In contrast the high bandwidth carrier 30 is provided with a relatively small amount of PDCCH resource which is consistent with supporting the communication of relatively large quantities of data.

As shown in FIG. 7 the load balancing entity 50 receives a collection of information indicating a number of communications terminals (UEs) which are currently supported on the low bandwidth carrier 52. In addition, the load balancing entity 50 also receives an indication of the traffic requirements for the communications terminal 54. For legacy communication terminals, there will a need to be radio resource control (RRC) handover signalling to cause the transition between the two carriers.

Which Communication Terminals should be Moved to the Low Bandwidth Carrier?

The choice of which communication terminals are load balanced to the low bandwidth carrier may be based on:

Communication terminals that enter RRC IDLE mode may be transferred to the low bandwidth carrier. The RRC IDLE mode communication terminals would receive paging traffic and would send tracking area updates (related to mobility). If there were significant numbers of IDLE mode communication terminals, the resulting tracking area update traffic could be significant if the communication terminals in the cell are mobile (for example the cell tower is next to a major road or railway). Tracking area updates involve both uplink and downlink RRC signalling.

Communication terminals that are in a low activity state in RRC CONNECTED state in the high bandwidth carrier may be put into a discontinuous reception (DRX) mode. They may listen to the PDCCH (in DRX mode) according to a short DRX cycle or a long DRX cycle. If a communication terminal is put into a DRX mode, it may be decided that such a communication terminal was in a low activity state, but still connected state. Hence an RRC CONNECTED communication terminal may be transferred to the low bandwidth carrier either:

When it transitions to the short DRX cycle "mode".

When it transitions to the long DRX cycle "mode".

Inactivity timers: if no data has been passed to the communication terminal for a certain period of time (this period may be determined by the network operator), the communication terminal may be sent to the low bandwidth carrier. Such an inactivity period can be used to determine whether a communication terminal goes into one of the DRX cycle mode.

Thresholds: if the data rate applied to a communication terminal is below a certain amount, the communication terminal could be sent to the low bandwidth carrier. This is again a method for putting a communication terminal into one of the DRX cycle mode.

IDLE Mode Communication Terminals

As explained above, in one example the load balancing entity is configured to move communications terminals which enter the IDLE mode to the low bandwidth carrier. However, once the communications terminals have camped on to the low bandwidth carrier, the communications terminals may attempt to re-attach to the high bandwidth network, because the high bandwidth network is offering a better signal to noise ratio or better received carrier power. Therefore in one embodiment, the communications terminals are adapted to bias their attachment to the low bandwidth carrier rather than the high bandwidth carrier. One technique for achieving this bias is to set a lower signal level quality requirement, which is termed Qrxlevmin in UMTS, for the low bandwidth interface, when communications terminals which enter the IDLE mode are transferred to the low bandwidth carrier. In that case IDLE mode communication terminals would preferentially attach to the carrier with the lower signal level quality requirements. In another example, instead of Qrxlevmin, an offset may be specified between the signal quality measurements on the high bandwidth carrier and the low bandwidth carrier, such that the communications terminal should compare the signal level S1 on the high bandwidth carrier with the level S1+offset on the low bandwidth carrier: if S1=S2 and the offset is positive then communication terminals would preferentially move to the low bandwidth carrier. By controlling Qrxlevmin or the offset, the proportion of IDLE mode communications terminals camped on to the low bandwidth carrier or the high bandwidth carrier can be controlled.

In some embodiments, communications terminals may be signalled, via System Information Broadcast (SIB) signalling, whether low activity communication terminals, such as IDLE mode communication terminals or communication terminals in DRX mode, should camp onto the low bandwidth carrier or onto the high bandwidth carrier. The signalling could also be used in combination with the signal level quality method described above, such that those communication terminals that are in a low activity state and are in poorer signal conditions camp onto the low bandwidth carrier while low activity state communication terminals in better signal conditions camp onto the high bandwidth carrier. This is because communication terminals in poorer signal conditions are more likely to generate traffic area update signalling than communication terminals in better signal conditions.

When a communication terminal becomes active on the low bandwidth carrier, the network may instruct the communications terminal to hand over to the high bandwidth carrier. This handover process is not controlled by these communication terminal measurements referred to above, but by the load balancing entity.

Signalling Flow Diagrams for Handover Based on Transfer to IDLE Mode

Figure 8:
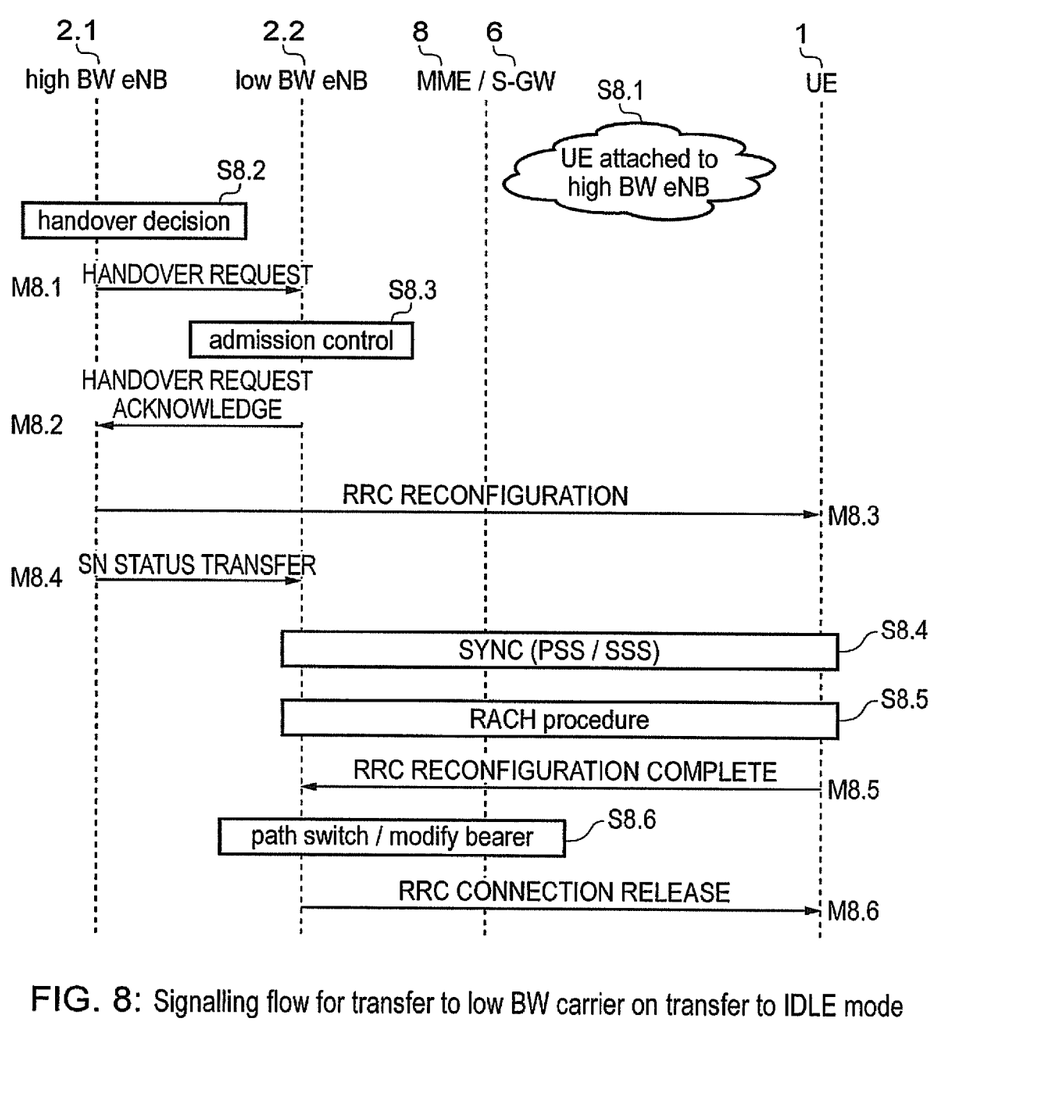
FIG. 8 is a signalling flow diagram illustrating an example of transferring a communications terminal from a high bandwidth carrier to a low bandwidth carrier when the communications terminal enters the idle mode.

FIG. 8 illustrates a signalling flow diagram for transferring a communication terminal from a high bandwidth eNode B 2.1 to a low bandwidth eNode B 2.2 when a transfer to IDLE mode is required.

The signalling flow illustrated in FIG. 8 is summarised below:

| step | name | description |
|---|---|---|
| S8.1 | UE Attached to high BW carrier | As a starting state it is assumed the mobile communications terminal is attached to a high bandwidth carrier. |
| S8.2 | handover decision | communication terminal is going to drop into IDLE mode due to inactivity. Load balancing in high bandwidth eNode B determines that this communication terminal should drop to the low bandwidth carrier. |
| M8.1 | handover request | backhaul signalling from the high bandwidth eNode B to the low bandwidth eNode B indicates that the communication terminal should be transferred to the low bandwidth eNode B. This message could also indicate (in the invention) that the communication terminal should be dropped to IDLE mode after the transfer. |
| S8.3 | admission control | The low bandwidth eNode B determines whether there is enough resource to allow the communication terminal to be transferred to it. The determination may be based on the number of communication terminals that are supported on the low bandwidth eNode B and the status of those communication terminals (for example if there are many MTC communication terminals on the low bandwidth carrier, admission control may fail. If there is a lot of PRACH resource being used on the low bandwidth carrier due to H2H communication terminals performing tracking area updates on the low bandwidth carrier (e.g. from communication terminals previously load balanced from the high bandwidth carrier to the low bandwidth carrier), then admission control might also fail). |
| M8.2 | handover request acknowledge | The low bandwidth eNode B confirms to the high bandwidth eNode B that a handover will be allowed. This message, that is transferred over the backhaul, contains a transparent container that contains the RRC reconfiguration message that the high bandwidth eNode B should send to the communication terminal in step M8.3. |
| M8.3 | RRC reconfiguration | the RRC reconfiguration message instructs the communication terminal to transfer to the low bandwidth eNode B. This message includes details such as the C-RNTI (radio network temporary identifier) to be used in the new cell as well as the configuration of the new cell, such as the PRACH configuration, PHICH configuration, maximum uplink transmit power etc. |
| M8.4 | SN status transfer | backhaul signalling transfers sequence numbers from the high bandwidth eNode B to the low bandwidth eNode B for lossless PDCP transfer. |
| S8.4 | SYNC procedure | communication terminal syncs to PSS and SSS signals of the low bandwidth eNode B. |
| S8.5 | RACH procedure | communication terminal performs RACH procedure to attach to low bandwidth eNode B |
| M8.5 | RRC connection reconfiguration complete | Part of attachment procedure to low bandwidth eNode B. |
| S8.6 | Path switch/modify bearer | The MME and serving gateway are informed of the new cell that the communication terminal is camped onto. |
| S8.6 | RRC connection release | Signalled from the low bandwidth eNode B to the communications terminal to cause the communications terminal to move into IDLE mode camped onto the low bandwidth eNode B. |

The signalling flow shown in FIG. 8 is for a movement of a communications terminal into the IDLE mode at the end of message M8.6. However the signalling flow presented in FIG. 8 is equally applicable to moving to the DRX state if message M8.6 is replaced by an RRC command to move to the DRX state. If the communications terminal is to enter the DRX state rather then the IDLE mode, either the RRC connection message M8.6 may be replaced by an RRC command instructing the communications terminal to move to the DRX state or the RRC connection release command M8.6 may be removed and an RRC command instructing the communications terminal to move to the DRX state may be inserted at or before message M8.3.

The above signalling flow (in the table) can be improved in the following ways:

| step | name | improvement |
|---|---|---|
| M8.31 | RRC reconfiguration | the message can be simplified by removing the configuration of the new cell. The configuration of the low BW "sister carrier" may be signalled in the high bandwidth carrier as part of system information. |
| M8.32 | RRC reconfiguration | The RRC reconfiguration could be replaced by an RRC connection release coupled with the IDLE mode load balancing means described above. This would cause the communication terminal to go into IDLE mode in the high bandwidth carrier and then perform a tracking update procedure in the low bandwidth carrier. The RRC connection release message may be smaller than the RRC reconfiguration message. |

Signalling Flow Diagrams for Moving Between Carriers Based on DRX State

Figure 9:
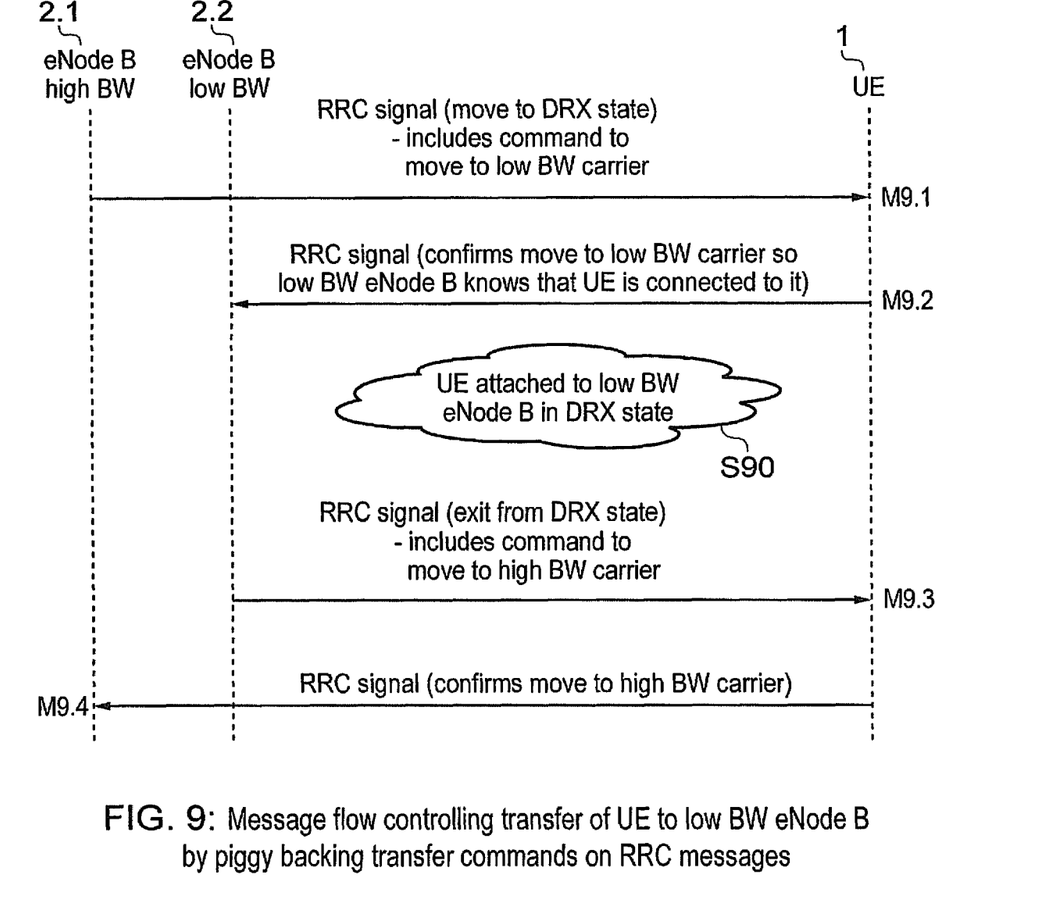
FIG. 9 is a message flow diagram illustrating an example of transferring a communications terminal from a high bandwidth carrier to a low bandwidth carrier by piggybacking transfer commands on RRC messages.
Figure 10:
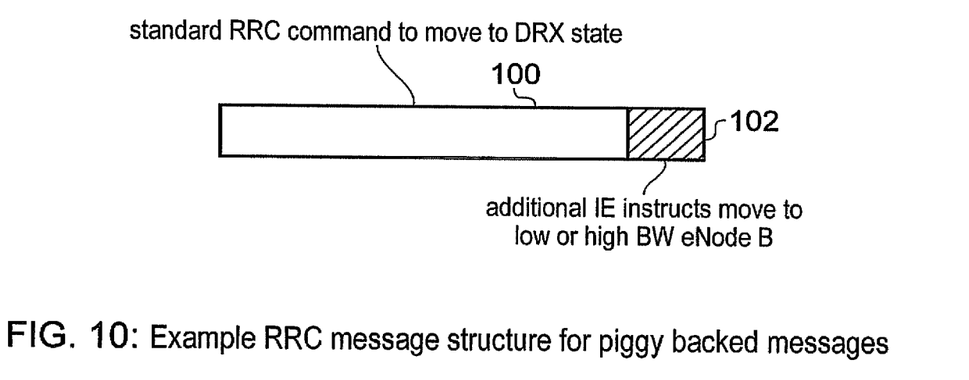
FIG. 10 is an illustrative representation of an RRC signalling message which has been adapted to include a field which provides a transfer instruction between a high bandwidth carrier and a low bandwidth carrier.

FIG. 9 shows the signalling sequence for transferring a communication terminal that is in the DRX state from a high bandwidth eNode B 2.1 to a low bandwidth eNode B 2.2 according to an example embodiment. A message which would be used to signal to the communications terminal to move to the DRX state and to transfer to the low bandwidth carrier is shown in FIG. 10. In FIG. 10 a command message 100 is shown to include an indication to transfer to another carrier piggybacked onto a command to move to a DRX state. This command message 102 may be used when moving from the high bandwidth carrier to the low bandwidth carrier which is piggybacked onto the command message 100 to move from a DRX state. FIG. 9 provides a call flow diagram illustrating a message flow controlling transfer of a communications terminal to the low bandwidth carrier eNode B by piggy backing transfer commands on RRC messages.

In FIG. 9 message M9.1 provides an indication of an RRC message that the communications terminal 1 should move to a DRX state. However, as shown in FIG. 10 in addition to the message signalling the RRC command 100 to move to the DRX state, the message includes a field 102 indicating that the communications terminal should move to the low bandwidth carrier or the higher bandwidth carrier eNode B 2.1.

In message 9.2 an RRC signal is communicated from the communications terminal to the eNode B 2.1 confirming the move of the communications terminal to the low bandwidth carrier so that the eNode B 2.2 knows that the communications terminal is connected to it.

In step S90 the communications terminal which is attached to the low bandwidth eNode B enters a DRX state. In message M9.3 the low bandwidth eNode B 2.2 communicates an RRC signal to the communications terminal 1 to command the communications terminal 1 to exit from the DRX state and to move to the high bandwidth carrier eNodeB.

In message M 9.4 the communications terminal communicates a message to the high bandwidth eNode B 2.1 which confirms its move to the high bandwidth carrier.

In an alternative embodiment using a piggybacked signalling arrangement, the message M8.3 may contain a command to move to the low bandwidth eNode B 2.2 and the RRC connection release message M8.6 may be removed.

Fast Transfer Between Low and High Bandwidth Carriers in Future Releases

In some embodiments, high bandwidth communication terminals may be configured to transfer automatically between the high bandwidth and low bandwidth carriers, in accordance with the following example conditions:

1. When engaged in significant activity, the communication terminal is attached to the high bandwidth carrier.
2. The network signals whether communication terminals are able to transfer to the low bandwidth carrier and provides information about the low bandwidth carrier (for example the exact carrier frequency, cell ID etc.). This signalling may be relatively slow signalling such as SIB (system information) signalling. The network may decide that communication terminals should be able to transfer to the low bandwidth carrier if the low bandwidth carrier is underutilized.
3. when a communication terminal drops into a low activity state, it drops the connection to the high bandwidth carrier and connects to the low bandwidth carrier. This function may be similar to a cell selection or fast cell selection operation.

When the communication terminal is attached to the low bandwidth carrier and has significant data to transmit, it automatically transfers to the high bandwidth carrier by performing a cell selection to the high bandwidth carrier. SIB signalling is provided on the low bandwidth and high bandwidth carriers indicating that communication terminals in a low activity state should camp onto the low bandwidth carrier. Communication terminals may be informed that they have been transferred to the low bandwidth carrier for load balancing purposes and that when they have significant data to transmit, they should do that on the high bandwidth carrier. Otherwise communication terminals would start transmitting the significant data referred to above on the low bandwidth carrier.

Various modifications may be made to the embodiments of the invention hereinbefore described with reference to the drawings without departing from the scope of the present invention as expressed in the appended claims. Other examples are envisaged within the scope of the appended claims, such as where the mobile communications network operates in accordance with a standard other than LTE. As will be appreciated a location of a load balancing device, which is responsible for transferring communications terminals to and from the low bandwidth carrier, can be located at any convenient point in the network. Load balancing can be used to achieve various ends, such as better matching of traffic characteristics to the type of radio access interface.

The present application claims priority to British Patent Application 1116898.6, filed in the UK IPO on Sep. 30, 2011 and British Patent Application 1116902.6, filed in the UK IPO on Sep. 30, 2011, the entire contents of which being incorporated herein by reference.

The invention claimed is:
1. A communications terminal, comprising:
circuitry configured to:
attach for communication to a high bandwidth communications interface according to a radio access technology;
receive a load balancing command, from a load balancer of a mobile communications network, while operating in a discontinuous reception (DRX) state and not in response to transmission of a measurement report, the load balancing command indicating to detach from the high bandwidth communications interface;
detach, in response to receiving the load balancing command, from the high bandwidth communications interface; and
attach, in response to receiving the load balancing command, to a low bandwidth communications interface according to the radio access technology for communicating data to or from the mobile communications network via the low bandwidth communications interface, wherein
the circuitry detaches from the high bandwidth communications interface and re-attaches to the low bandwidth communications interface without checking whether the detaching and the re-attaching are necessary.
2. The communications terminal as claimed in claim 1, wherein the load balancer of the mobile communications network performs a load balancing process and transmits the load balancing command to optimize utilization of communications resources on the low bandwidth carrier.
3. The communications terminal as claimed in claim 1, wherein the circuitry is configured to receive the load balancing command in response to first predetermined conditions, and the first predetermined conditions include at least one of a characteristic of the data communicated via the high bandwidth communications interface and a state of the communications terminal attached to the high bandwidth communications interface.

4. The communications terminal as claimed in claim 3, wherein the state of the communications terminal attached to the high bandwidth communications interface indicates whether the communications terminal enters an idle state, and the circuitry is configured to, in response to the communications terminal entering the idle state, receive the load balancing command from the load balancer to detach from the high bandwidth communications interface and to re-attach to the low bandwidth communications interface.

5. The communications terminal as claimed in claim 3, wherein the state of the communications terminal attached to the high bandwidth communications interface indicates whether the communications terminal enters the DRX state, and the circuitry is configured to, in response to the communications terminal entering the DRX state, receive the load balancing command from the load balancer to detach from the high bandwidth communications interface and to re-attach to the low bandwidth communications interface.

6. The communications terminal as claimed in claim 3, wherein the state of the communications terminal attached to the high bandwidth communications includes indicates whether the communications terminal has not transmitted or received data for a predetermined period, and the circuitry is configured to, in response to detecting that the communications terminal has not transmitted or received data for the predetermined period, receive the load balancing command from the load balancer to detach from the high bandwidth communications interface and to re-attach to the low bandwidth communications interface.

7. The communications terminal as claimed in claim 3, wherein the state of the communications terminal attached to the high bandwidth communications interface includes a rate of communicating data to or receiving data from the mobile communications network, and the circuitry is configured to, in a case that the data rate falls below a predetermined amount, receive the load balancing command from the load balancer to detach from the high bandwidth communications interface and to re-attach to the low bandwidth communications interface.

8. The communications terminal as claimed in claim 1, wherein the circuitry is configured to receive a radio resource control (RRC) message which includes an indication, from the mobile communications network, to detach from the high bandwidth communications interface and to re-attach to the low bandwidth communications interface.

9. The communications terminal as claimed in claim 8, wherein the RRC message includes a field indicating that the communications terminal should detach from the high bandwidth communications interface and re-attach to the low bandwidth communications interface.

10. The communications terminal as claimed in claim 1, wherein the circuitry is configured to receive a biasing condition for re-attaching to the high bandwidth communications interface from the low bandwidth communications interface so that the communications terminal remains preferentially attached to the low bandwidth communications interface.

11. The communications terminal as claimed in claim 10, wherein the circuitry is further configured to:
receive an indication of an adapted received signal quality level for determining whether the communications terminal should detach from the low bandwidth communications interface and re-attach to the high bandwidth communications interface;
compare a quality of signals received from the low bandwidth communications interface and the high bandwidth communications interface; and
determine whether to re-attach to the high bandwidth communications interface based on the comparison of the quality of the received signals, and the comparison of the received signal quality includes the adapted received signal quality level so that the communications terminal is biased to preferentially remain attached to the low bandwidth communications interface.

12. The communications terminal as claimed in claim 1, wherein in response to second predetermined conditions, the communications terminal re-attaches to the high bandwidth communications interface and detaches from the low bandwidth communications interface.

13. The communications terminal as claimed in claim 12, wherein the second predetermined conditions include at least one of a requirement for the communications terminal to receive data requiring a relatively high bandwidth, and a requirement for the communications terminal to transmit data requiring a relatively high bandwidth or a relatively high utilization of communications resources of the low bandwidth communications interface by the one or more communications terminals which can only communicate data via the low bandwidth communications interface.

14. The communications terminal as claimed in claim 1, wherein the radio access technology operates in accordance with a 3GPP LTE standard.

15. A communications terminal, comprising:
a transmitter; and
a receiver, wherein
the transmitter and receiver are configured to
transmit to and receive data from a high bandwidth communications interface according to a radio access technology, and
transmit to and receive data from a low bandwidth communications interface according to the radio access technology after the communications terminal detaches, in response to a load balancing command, from the high bandwidth communications interface and attaches, in response to the load balancing command, to the low bandwidth communications interface, wherein
the communications terminal receives the load balancing command, from a load balancer of a mobile communications network, while operating in a discontinuous reception (DRX) state and not in response to transmission of a measurement report, the load balancing command indicating to detach from the high bandwidth communications interface, and the communications terminal detaches from the high bandwidth communications interface and re-attaches to the low bandwidth communications interface without checking whether the detaching and the re-attaching are necessary.

16. The communications terminal as claimed in claim 15, wherein the load balancer of the mobile communications network performs a load balancing process and transmits the load balancing command to optimize utilization of communications resources on the low bandwidth carrier.

17. The communications terminal as claimed in claim 15, wherein the receiver is configured to receive the load balancing command in response to first predetermined conditions, and the first predetermined conditions include at least one of a characteristic of the data communicated via the high bandwidth communications interface and a state of the communications terminal attached to the high bandwidth communications interface.

18. The communications terminal as claimed in claim 17, wherein the state of the communications terminal attached to the high bandwidth communications interface indicates whether the communications terminal enters an idle state, and the receiver is configured to, in response to the communications terminal entering the idle state, receive the load balancing command from the load balancer to detach from the high bandwidth communications interface and to re-attach to the low bandwidth communications interface.

19. The communications terminal as claimed in claim 17, wherein the state of the communications terminal attached to the high bandwidth communications interface indicates whether the communications terminal enters the DRX state, and the receiver is configured to, in response to the communications terminal entering the DRX state, receive the load balancing command from the load balancer to detach from the high bandwidth communications interface and to re-attach to the low bandwidth communications interface.

20. The communications terminal as claimed in claim 17, wherein the state of the communications terminal attached to the high bandwidth communications interface indicates whether the communications terminal has not transmitted or received data for a predetermined period, and the receiver is configured to, in response to detecting that the communications terminal has not transmitted or received data for the predetermined period, receive the load balancing command from the load balancer to detach from the high bandwidth communications interface and to re-attach to the low bandwidth communications interface.

* * * * *